Aug. 6, 1935. F. NETZ 2,010,733
COMBINED SUSPENSION AND COUPLING STRUCTURE FOR A HOOK
Filed May 7, 1934
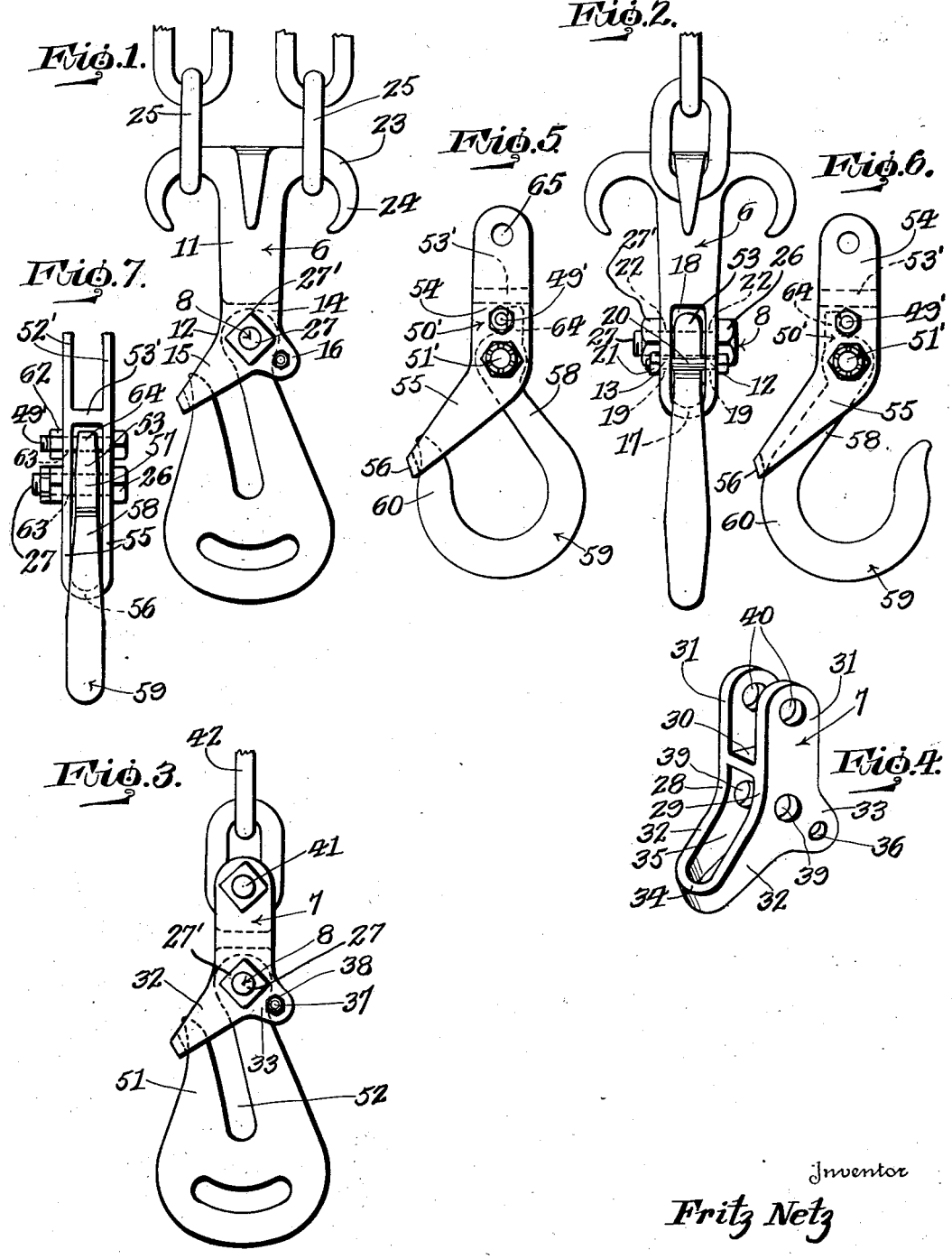
Inventor
*Fritz Netz*
By *Geo. T. Kimmel*
Attorney Patented Aug. 6, 1935

2,010,733

UNITED STATES PATENT OFFICE 2,010,733

COMBINED SUSPENSION AND COUPLING STRUCTURE FOR A HOOK

Fritz Netz, Odell, Nebr.

Application May 7, 1934, Serial No. 724,448

8 Claims. (Cl. 294—83)

This invention relates to a combined suspension and coupling structure for a hook, and has for its object to provide, in a manner as hereinafter set forth, a structure of the class referred to including means for coupling with a hoisting apparatus a hook employed for elevating and lowering purposes.

A further object of the invention is to provide, in a manner as hereinafter set forth, a combined suspension and coupling structure including means for coupling therewith and locking in closed position a hook employed for elevating and lowering purposes.

A further object of the invention is to provide, in a manner as hereinafter set forth, a combined suspension and coupling structure including means for coupling therewith and to arrest the pivoting of a suspension hook employed for elevating and lowering purposes.

A further object of the invention is to provide, in a manner hereinafter set forth, a combined coupling and suspension structure for a hook employed for elevating and lowering purposes and with the structure provided with means for connecting thereto a series of elevating and lowering members for the hook.

A further object of the invention is to provide, in a manner hereinafter set forth, a combined coupling and suspension structure for selectively coupling therewith in open and closed positions a suspension hook employed for elevating and lowering purposes.

Further objects of the invention are to provide, in a manner as hereinafter set forth, a combined coupling and suspension structure for hooks which is simple in its construction, strong, durable, compact, thoroughly efficient in its use, readily assembled and disassembled when required, and comparatively inexpensive.

To the above ends essentially and to others which may hereinafter appear the invention consists of such parts, and in such combination of parts which fall within the scope of the invention as claimed.

In the drawing:

Figure 1 is a side elevation of the combined suspension and coupling structure with the hook locked, closed and suspended.

Figure 2 is a view looking towards one edge of the structure.

Figure 3 is a side elevation of a modified form of combined suspension and coupling structure, in accordance with this invention with the hook locked, closed and suspended.

Figure 4 is a perspective view of one of the elements employed in the form shown in Figure 3.

Figures 5 and 6 are side elevations of still another modified form, and

Figure 7 is an edge view of the form shown in Figures 5 and 6.

A combined suspension and coupling structure, in accordance with the invention includes a combined coupling and locking unit, and a hook suspending unit. In Figures 1 and 2 the coupling and locking unit is designated 6. In Figures 3 and 4 the coupling and locking unit is designated 7. The hook suspending unit is indicated at 8 and the extension unit at 9. The unit 9 may be selectively employed with the units 6 and 7 when the hook, designated at 10 is to be employed in open and shiftable position. By way of example unit 9 is shown as coupled to and depending from the unit 6.

The unit 6 includes a body part 11 preferably of polygonal cross section terminating at its lower end into a pair of spaced parallel angle-shaped depending arms 12, 13, of like form. Each arm consists of a vertical leg 14, an outwardly directed downwardly inclined leg 15 extending from one side of the leg 14 and an outwardly directed downwardly inclined leg 16 extending from the outer side of the leg 14. The legs 15, 16 are arranged at the lower portion of an arm, disposed at opposite inclinations with respect to each other and with the leg 15 of greater length than the leg 16. The outer end of leg 15 of arm 12 merges into one end of an outwardly curved coupling portion 17. The other end of the latter merges into the outer end of leg 15 of arm 12. The leg 14 in connection with the legs 15 and the coupling portion 17 provide a loop 18. The portion 17 also constitutes a locking member for the hook 10. The legs 15 in connection with the portion 17 provide a closure for hook 10. The legs 16 are free of connection with each other at their outer ends and formed with aligning openings 19 through which extend a headed stop bolt 20 to arrest the shifting or pivoting movement of the hook 10. A securing nut 21 is carried by bolt 20. The legs 14 are formed with aligning openings 22 for a purpose to be referred to. The body part 11 is formed with laterally disposed curved claws 23 extending from the upper end of each side face thereof. The claws 23 are disposed at right angles to each other and also to body part 11. The top edges of the claws 23 are flush with the top edge of body part 11. The bills 24 of the claws 23 extend downwardly and are disposed in opposed spaced relation to the side faces of body part 11. The claws 23 are provided for coupling to unit 6 a series of hoisting members 25 which are shown in the form of chains.

The hook suspending unit 8 which is selectively employed in connection with any one of the units 6 and 7 includes a headed bolt 26 having the shank 27 of greater diameter than the shank of bolt 26. The unit 8 also includes a securing nut 27' carried by shank 27. When unit 8 is employed with unit 6 it extends through the aligning openings 22 of such unit.

The unit 7 includes a pair of spaced parallel vertical arms 28, 29 of like form connected together intermediate their ends by a horizontally disposed web 30 arranged therebetween and integral therewith. Each of said arms consists of a vertical leg 31, an outwardly directed downwardly inclined leg 32 extending from one side of the leg 31 and an outwardly directed downwardly inclined leg 33 extending from the other side of leg 31. The legs 32, 33 are arranged at the lower portion of an arm, disposed at opposite inclination with respect to each other and with the leg 32 of greater length than the leg 33. The outer end of leg 33 of arm 28 merges into one end of an outwardly curved coupling portion 34. The other end of the latter merges into the outer end of leg 33 of arm 29. The legs 31 in connection with the legs 32, the coupling portion 34 and web 30 provide a loop 35. The portion 34 also constitutes a locking member for the hook 10. The legs 32 in connection with the portion 34 provide a closure for hook 10. The legs 31 are free of connection with each other at their upper ends. The legs 33 are free of connection with each other at their outer ends and formed with aligning openings 36 through which extend a headed stop bolt 37 to arrest the shifting or pivoting movement of hook 10. A securing nut 38 is carried by bolt 37. The legs 31 adjacent their lower ends and below web 30 are formed with aligning openings 39 for the passage of the shank 27 of bolt 26. The legs 31 adjacent their upper ends and above web 30 are provided with aligning openings 40 for the passage of a bolt 41 carrying a securing nut. The bolt 41 is employed for coupling to the upper end of unit 8 a hoisting member 42 which is illustrated in the form of a chain.

The hook 10 includes a shank 50 having extended upwardly from the lower portion of the latter a bill 51 which coacts with the shank 50 to form an elongated inclined slot 52 open at its upper end. The shank 50 has its upper end formed with an opening 53 for the passage of unit 8 to couple hook 10 to unit 6 or 7.

The form shown in Figures 5, 6 and 7 illustrates a different position of the stop bolt 49' which corresponds to the bolt 26 Figure 2 and bolt 37 Figure 3. With reference to Figures 5, 6 and 7 a coupling and locking unit is designated at 50' and a hook suspending unit at 51'. The unit 50' includes a pair of spaced parallel vertical arms 52' of like form connected together intermediate their ends by a horizontally disposed web 53' arranged therebetween and integral therewith. Each of said arms include a vertical leg 54 and an outwardly directed downwardly inclined leg 55 extending from the lower portion of leg 54. The outer end of the leg 55 of one arm 52' merges into one end of an outwardly curved coupling portion 56. The other end of the latter merges into the outer end of the leg 55 of the other arm 52'. The legs 54, 55, and 53' and portion 56 provide a loop for the reception of the apertured upper end 57 of the shank 58 of the hook 59. The portion 56 also constitutes a locking member for the bill 60 of the hook 59. The legs 54 above the web 53' have parallel openings 61 for the passage of the locking bolt 49'. The latter is headed by one end and carries a securing nut 62 at its other end. The legs 54 below the web 53' have parallel openings 63 for the passage of the suspended unit 51 for the hook 59. The unit 51' is of the same form as unit 8 and extends through the apertured part 57 of bolt 59. The top edge of the shank 58 is formed with an upstanding curved protuberance 64 which coacts with bolt 49 to prevent the pivoting of hook 59 when the latter is in the position shown in Figures 5 and 6. When the hook 59 is in its non-pivoting position, due to bolt 49' engaging protuberance 64 and portion 56 engaging bill 60 it is closed.

The upper portion of unit 51' may be the same as shown with respect to unit 6 or as shown with respect to unit 7. It is shown by way of example similar to unit 7, but with the omission of the bolt 41. The legs 54 have parallel openings 65 for the passage of bolt 41.

With reference to Figure 6 the hook 59 is shown suspended from unit 50 in open position.

What I claim is:

1. In a hook suspension and coupling structure a combined locking and coupling unit adapted to be connected to a hoisting means and having a hollow lower portion opening at its bottom and sides for the reception of the shank of the hook, a suspension unit secured to the locking and coupling unit for extension through the shank of the hook to pivotally suspend the latter, said locking and coupling unit having its lower portion provided with an integral rigid laterally extending downwardly inclined extension providing a loop for closing the hook between the bill and the shank of the latter, said loop open at its inner end, and means carried by the locking and coupling unit, coacting with said loop and spaced from said suspension unit for engaging the hook to lock it from movement.

2. In combination, a combined locking and coupling unit, a hook having a shank formed with an opening, said shank having a protuberance on its free end offset with respect to the axis of said opening, said unit having a hollow lower portion opening at its sides and bottom for the reception of said shank, a suspension unit extending through the lower portion of the said other unit and said opening for pivotally suspending the hook, said locking and coupling unit being formed at its lower end with an integral rigid laterally extending downwardly inclined extension providing a loop for overlapping the bill of the hook for closing the latter between the bill and the shank, said loop being opened at its inner end, and means secured to the locking and coupling unit above said suspension unit and coacting with the loop and protuberance for locking the hook from movement.

3. In a hook suspension and coupling structure, a combined locking and coupling unit adapted to be connected to a hoisting device, said unit comprising a body having a hollow lower portion opening at its sides and bottom for the insertion of the shank of a hook to be suspended, said body being formed at its lower end with an outwardly directed laterally disposed rigid downwardly inclined extension providing a loop for overlapping the bill of the hook for closing the latter between the said bill and shank, said loop being open at its inner end, said body being provided with stop means spaced from the loop for abutting the hook and providing in connection with said hook for the locking of the hook, when the latter is suspended from movement, and said body being apertured for connecting thereto a suspension means for the hook.

4. In a hook suspension and coupling structure, a combined locking and coupling unit adapted to be connected to a hoisting device, said unit comprising a body having its lower portion open for the insertion of the shank of a hook to be suspended, said body being formed at its lower end with an outwardly directed laterally disposed rigid downwardly inclined extension providing a loop for overlapping the bill of the hook for closing the latter between the said bill and shank, said body being provided with stop means spaced from the loop for abutting the hook and providing in connection with the loop for the locking of the hook, when the latter is suspended from movement, said body being provided at its lower end with a pair of outwardly directed laterally disposed downwardly inclined parallel spaced extensions extending in an opposite direction with respect to said loop and supporting said stop means, and a hook suspension means, said body being apertured for connecting thereto the suspension means for the hook.

5. In a hook suspension and coupling structure, a combined locking and suspension unit having means at its upper end for connecting a hoisting device thereto, said unit having its lower portion open for the reception of the shank of the hook, said unit being formed at the lower end of one side with an integral rigid laterally disposed extension forming a loop for overlapping the bill of the hook for closing the latter, said loop open at its inner end, said unit being formed at the lower end of the other side thereof with a pair of integral rigid laterally disposed parallel spaced extensions, a suspension unit secured to the said other unit above the loop and pair of extensions, and a stop means carried by said pair of extensions for abutting the hook and coacting with said loop for locking the hook from movement.

6. In a hook suspension and coupling structure, a combined locking and coupling unit provided at its upper portion with means for coupling it to an elevating and lowering hoist, said unit in proximity to its lower end being formed with means for receiving a suspension device for the hook, said unit having its lower part in the form of a pair of spaced parallel portions provided with opposed laterally extending downwardly inclined extensions connected together at their outer ends to provide a stop, and a stop bolt extending across the space formed by and anchored to said portions.

7. In a hook suspension and coupling structure, a combined locking and coupling unit provided at its upper portion with means for coupling it to an elevating and lowering hoist, said unit in proximity to its lower end being formed with means for receiving a suspension device for the hook, said unit having its lower part in the form of a pair of spaced parallel arms each provided with a pair of oppositely disposed downwardly inclined lower end terminal portions, one of the terminal portions of one arm being coupled to one of the end terminal portions of the other arm to provide a stop, and a bolt connected to the other terminal portions of said arms to provide a stop.

8. In a hook suspension and coupling structure, a combined locking and coupling unit adapted to be connected to a hoisting device, said unit comprising a body having a hollow lower portion opening at its sides and bottom for the insertion therein of the shank of a hook to be suspended, said body being formed at its lower end with a laterally disposed hollow extension forming a loop for overlapping a portion of the suspended hook, said loop being open at its inner end, said body adjacent said loop being formed with means to receive a suspension pivot for the shank of the hook, and said body being formed with means located adjacent the split end of the loop for abutment against the hook for arresting the swinging movement of the latter.

FRITZ NETZ.